(12) United States Patent
Suckewer et al.

(10) Patent No.: US 6,745,744 B2
(45) Date of Patent: Jun. 8, 2004

(54) COMBUSTION ENHANCEMENT SYSTEM AND METHOD

(76) Inventors: Szymon Suckewer, 10 HacLean Cir., Princeton, NJ (US) 08540; Artur Peter Suckewer, 67 De Leon Cir., Franklin Park, NJ (US) 08823

( * ) Notice: Subject to any disclaimer, the term of this patent is extended or adjusted under 35 U.S.C. 154(b) by 0 days.

(21) Appl. No.: 09/876,165

(22) Filed: Jun. 8, 2001

(65) Prior Publication Data

US 2002/0017271 A1 Feb. 14, 2002

Related U.S. Application Data

(60) Provisional application No. 60/210,243, filed on Jun. 8, 2000.

(51) Int. Cl.⁷ .............................................. F02M 57/06
(52) U.S. Cl. ..................................................... 123/297
(58) Field of Search ................................. 123/297, 298, 123/305, 143 B, 143 C; 313/120, 135, 141, 142, 143

(56) References Cited

U.S. PATENT DOCUMENTS

| | | | | |
|---|---|---|---|---|
| 2,795,214 A | * | 6/1957 | Shook, II | 123/297 |
| 3,361,353 A | * | 1/1968 | Millman | 239/5 |
| 3,996,915 A | * | 12/1976 | Demetrescu | 123/297 |
| 4,062,327 A | * | 12/1977 | Knights | 123/25 R |
| 4,095,580 A | * | 6/1978 | Murray et al. | 123/297 |
| 4,319,552 A | * | 3/1982 | Sauer et al. | 123/297 |
| 4,396,854 A | * | 8/1983 | Weinberg | 313/120 |
| 4,448,160 A | * | 5/1984 | Vosper | 123/169 PA |
| 4,787,360 A | | 11/1988 | Filippone | 123/606 |
| 4,864,989 A | * | 9/1989 | Markley | 123/267 |
| 4,967,708 A | * | 11/1990 | Linder et al. | 123/297 |
| 5,076,223 A | | 12/1991 | Harden et al. | 123/143 B |
| 5,143,025 A | | 9/1992 | Munday | 123/3 |
| 5,159,900 A | | 11/1992 | Dammann | 123/3 |
| 5,207,185 A | | 5/1993 | Greiner et al. | 123/3 |
| 5,245,959 A | * | 9/1993 | Ringenbach | 123/169 V |
| 5,361,737 A | | 11/1994 | Smith et al. | 123/143 B |
| 5,377,633 A | | 1/1995 | Wakeman | 123/297 |
| 5,497,744 A | * | 3/1996 | Nagaosa et al. | 123/297 |
| 5,531,199 A | * | 7/1996 | Bryant et al. | 123/297 |
| 5,704,321 A | | 1/1998 | Suckewer et al. | 123/143 B |
| 5,715,788 A | * | 2/1998 | Tarr et al. | 123/297 |
| 5,852,993 A | * | 12/1998 | Anderson | 123/297 |

(List continued on next page.)

FOREIGN PATENT DOCUMENTS

SU         1368936    *  1/1988    ........... H01T/13/00

OTHER PUBLICATIONS

L. M. Das; "Hydrogen Engines: A View of the past and a Look Into the Future"; *Int. J. Hydrogen Energy*; vol. 15, No. 6, pp. 425–443, (1990).

(List continued on next page.)

*Primary Examiner*—Mahmoud Gimie
*Assistant Examiner*—Hai Huynh
(74) *Attorney, Agent, or Firm*—Morgan Lewis & Bockius LLP (57) ABSTRACT

A combustion enhancement system that enhances combustion by converting fuel into hydrogen-enriched fuel within a combustion region, and igniting the hydrogen-enriched fuel by one or more ignitor. A fuel supply provides at least one of fuel or air/fuel mixture to the discharge gap of the ignitor. A method is also provided to dissociate a fuel or air/fuel mixture into hydrogen enriched combusible mixture. The method includes locating the ignition device so that the discharge gap is in device communication with the combustion region, and dissociating at least one of fuel, or air/fuel mixture into hydrogen enriched combustible fuel mixture within the discharge gap. A method of igniting is also provided.

87 Claims, 4 Drawing Sheets

U.S. PATENT DOCUMENTS

| | | | | |
|---|---|---|---|---|
| 5,887,554 A | | 3/1999 | Cohn et al. ................... 123/3 |
| 5,937,813 A | * | 8/1999 | Shifflette ................ 123/169 V |
| 5,983,855 A | * | 11/1999 | Benedikt et al. ............ 123/297 |
| 6,073,607 A | * | 6/2000 | Liber ......................... 123/150 |
| 6,119,651 A | * | 9/2000 | Anderson .................... 123/297 |
| 6,131,542 A | | 10/2000 | Suckewer et al. ...... 123/143 B |
| 6,135,084 A | * | 10/2000 | Corneer ....................... 123/259 |
| 6,260,546 B1 | * | 7/2001 | Vaughn ....................... 123/297 |
| 6,289,869 B1 | * | 9/2001 | Elliott ......................... 123/297 |
| 6,340,015 B1 | * | 1/2002 | Benedikt et al. ............ 123/297 |
| 6,439,191 B1 | * | 8/2002 | Elliott ......................... 123/297 |
| 6,536,405 B1 | * | 3/2003 | Rieger et al. ............... 123/297 |

OTHER PUBLICATIONS

M. A. DeLuchi; "Hydrogen Vehicles: An Evaluation of Fuel Storage, Performance, Safety, Environmental Impacts, and Cost"; *Int. J. Hydrogen Energy*, vol. 14, No. 2, pp. 81–130, (1989).

Rabinovich et al.; "Plasmatron Internal Combustion Engine System for Vehicle Pollution Reduction"; *Int. J. of Vehicle Design*; vol. 15, Nos. 3/4/5, pp. 234–242, (1994).

Cohn et al.; "Onboard Plasmatron Generation of Hydrogen for Extremely Low Emission Vehicles with Internal Combustion Engines"; *Int. J. of Vehicle Design*, vol. 17, Nos. 5/6, pp. 550–561; (1996).

Cohn et al.; "Near–Term Possibilities For Extremely Low Emission Vehicles Using OnBoard Plasmatron Generation of Hydrogen"; *Int. J. Hydrogen Energy*; vol. 22, No. 7, pp. 715–723, (1997).

Bromberg et al.; "Compact Plasmatron–boosted Hydrogen Generation Technology for Vehicular Applications"; *Int. J. of Hydrogen Energy*; vol. 24, pp. 341–350; (1999).

Breshears, R., Cotrill, H., "Partial Hydrogen Injection into Internal Combustion Engines," Proc. EPS 1st Symp. On Low Pollution Power Systems Development, Ann Arbor, MI 1973).

* cited by examiner

COMBUSTION ENHANCEMENT SYSTEM AND METHOD

CROSS-REFERENCE TO RELATED APPLICATIONS

This application claims the benefit of the earlier filing date of U.S. Provisional Application No. 60/210,243, filed on Jun. 8, 2000, which is hereby incorporated by reference in its entirety.

BACKGROUND OF THE INVENTION

It is believed that adding hydrogen to fuel makes an engine run cleaner as hydrogen is believed to promote complete combustion. This appears to be described, for example, by: Heywood, J. B. in *Internal Combustion Engine Fundamentals* (McGraw Hill, 773–774, 1988), Das, L. M. in paper "Hydrogen engines: a view of the past and a look into the future" (Int. J. Hydrogen Energy, vol. 15, p. 425, 1990), and DeLuchi, M. A. in paper "Hydrogen; and evaluation of fuel storage, performance, safety environmental impacts, and cost" (Int. J. Hydrogen Energy, vol. 14, p. 81, 1989). A problem with these examples was that they failed to explicitly teach how to efficiently generate hydrogen on-board, in compact devices. Alternative approaches of storing hydrogen on-board are not practical because they may require high pressure vessels, cryogenic containers if the hydrogen is to be stored as a compressed gas, liquid, or a large container if the hydrogen is to be stored as a hydride.

Several approaches are believed to have been pursued for on-board production of hydrogen. One of these approaches appear to use electrolysis of water, i.e. breaking down water molecule into hydrogen and oxygen and introducing the hydrogen into an internal combustion engine as stated by Munday, J. F. in "Hydrogen and Oxygen System for Producing Fuel Engines", U.S. Pat. No. 5,143,025. However, it is believed that production of hydrogen by electrolysis is about one order of magnitude less efficient than by plasma devices. Hydrogen can also be produced on-board by water interaction with solid carbon by passing electrical current between the carbon electrodes as stated in Dammann, W. A., "Methods and Means of Generating Gas from Water for use as a Fuel," U.S. Pat. No. 5,159,900, wherein carbon is oxidized to form CO and $H_2$. This approach may be impractical due to the short duration and high current requirement. Alternatively, Greiner, L., and Moard, D. M., "Emissions Reduction System for Internal Combustion Engines," of U.S. Pat. No. 5,207,185, proposed to use a burner, which utilizes a portion of the hydrocarbon fuel to reform another portion to produce hydrogen. The hydrogen is then mixed with the hydrocarbon fuel for introduction into an internal combustion engine. More practical approach seems to be taken by Breshears et al. (see paper by Breshears, R., Cotrill, H., and Rupe, T., "Partial Hydrogen Injection into Internal Combustion Engines," Proc. EPS $1^{st}$ Symp. On Low Pollution Power Systems Development, Ann Arbor, Mich. 1973). They proposed to direct a fraction of gasoline from the flow path to the engine and pass it through a thermal converter where steam reforms to yield hydrogen-rich gas.

An approach for on-board production of hydrogen for internal combustion engine fuel enrichment has been developed. This approach utilizes a relatively small size plasmatron (believed to be the size of a wine bottle) to facilitate conversion of a wide range of hydrocarbon fuels into hydrogen-rich gas without the use of a catalyst as stated in the following papers: Rabinovich, A., Cohn, D. R., and Bromberg, L., "Plasmatron Internal Combustion Engine System for Vehicle Pollution Reduction," Int. J. Vehicle Design, vol. 15, p. 234, 1995; Cohn, D. R., Rabinovich, A., and Titus, C. H., "Onboard Plasmatron Operation Generation of Hydrogen for Extremely Low Emission Vehicles with Internal Combustion Engines," Int. J. Vehicle Design, vol. 17, p. 550, 1996; Cohn, D. R., Rabinovich, A., Titus, C. H., and Bromberg, L., "Near Term Possibilities for Extremely Low Emission Vehicles using On-board Plasmatron Generation of Hydrogen," Int. J. Hydrogen Energy, vol. 22, p. 715, 1997; Cohn, D. R., Rabinovich, A., Titus, C., "Rapid Response Plasma Fuel Converter Systems," U.S. Pat. No. 5,887,554, 1999. An internal combustion engine is connected to receive the hydrogen-rich gas from the plasmatron. A plasmatron is believed to generate plasma by heating an electrically conducting gas either by an arc discharge, by a high frequency inductive or by a microwave discharge. In a plasmatron plasma, at temperatures between 5,000–10,000 K, the reaction rates are high for partial oxidation conversion of a hydrocarbon and air into hydrogen-rich gas. The process which was described by Bromberg, L., Cohn, D., Rabinovich, A., Sama, J., Virolen, J., in the paper "Compact plasmatron-boosted hydrogen generation technology for vehicular applications" (Inter. Journal of Hydrogen Energy, vol. 24, pp. 341–350, 1999) can be presented as follows:

$$2C_nH_m + nO_2 + 4nN_2 \rightarrow 2nCO + mH_2 + 4nN_2 \qquad (1)$$

where m and n are the numbers of carbon and hydrogen atoms in the hydrocarbon molecule.

The plasmatron is very attractive as one of many ways of producing hydrogen-rich gas for vehicles. It should be possible to almost instantaneously produce hydrogen-rich gas, which can be used in the startup of a vehicle. Throughout the driving cycle, rapid changes in hydrogen-rich gas flow may be accommodated by varying plasmatron parameters such as, for example, energy input, flow rate, product gas composition, etc. Although the plasmatron may be advantageous in vehicle applications, its size is believed to deter a practical application.

SUMMARY OF THE INVENTION

The present invention provides a system to deliver fuel through an ignition source. The system of the present invention provides for an ignition source that utilizes a plasma ignition device. The plasma ignition device, which has an arrangement for delivering fuel to the ignition source, also includes a fuel or air and fuel mixture (air/fuel) dissociating device that improves a combustion cycle. The present inventions achieve this improvement by affecting the physical structure of the air/fuel mixture that enters the chamber of a combustion chamber. The present invention provides for a fuel delivery system that dissociates fuel within the combustion chamber. The present invention can dissociate fuel or an air/fuel mixture to improve the quality of the fuel for combustion. The dissociation of the fuel can include hydrogenating the fuel or the air/fuel mixture. The present invention can dissociate fuel and also ignite the fuel. The dissociation and ignition of the fuel, within the system of the present invention, can be accomplished by a single ignition source. The single ignition source could be a high-energy ignition source that has a short duration for generating and moving a plasma. The present invention also provides a fuel delivery system that allows for particularized control of the quality and quantity of the fuel/air mixture supplied to a combustion chamber. The present invention also provides for a direct injection fuel system that can utilize a single component for both dissociating and igniting fuel, air/fuel mixture or a combustible mixture. The present invention also provides a system that reduces the fuel delivery space requirements within an engine compartment.

In one preferred embodiment, the present invention provides for a fuel delivery system. The system comprises an ignitor proximate a combustion region. The ignitor includes a first electrically conductive surface spaced from a second electrically conductive surface to form a gap in direct communication with the combustion region. A fuel supply provides at least one of fuel or air/fuel mixture to the gap. A controller provides at least one electrical pulse between the first conductive surface and second conductive surface that dissociates at least one of fuel or air /fuel mixture passing through the discharge gap.

In another preferred embodiment, the present invention provides for a fuel delivery system. The system comprises an ignitor proximate a combustion region. The ignitor includes a housing, a first electrically conductive surface, a second electrically conductive surface spaced from the first electrically conductive surface to form a discharge gap. The second electrically conductive surface has a second length. The shorter of the first and second lengths defines a discharge gap length. The shortest distance between the first electrically conductive surface and the second electrically conductive surface defines a discharge gap width. A ratio of the discharge gap width to the discharge gap length being greater than one to three. A fuel supply is operatively connected to ignitor to provide at least one of fuel or air/fuel mixture to the discharge gap. A controller provides at least one electrical pulse between the first electrically conductive surface and second electrically conductive surface.

In another preferred embodiment of the invention, a fuel delivery system is provided. The fuel delivery system comprises an ignitor proximate a combustion region. The ignitor includes a first electrically conductive surface spaced from a second electrically conductive surface to form a discharge gap in direct communication with the combustion region. An insulator has a surface exposed to the discharge gap. The discharge gap has an initiation region, the insulator has a surface exposed to the discharge gap that provides at least a portion of the initiation region. The insulator has at least a portion of a surface exposed to the discharge gap. A fuel supply provides at least one of fuel or air/fuel mixture to the discharge gap. A controller is also provided with the system.

In another preferred embodiment, the present invention provides for a fuel delivery system. The system comprises an ignitor coupled to the combustion region. The ignitor includes a housing has first portion and a second portion disposed along a central longitudinal axis, an electrode extends along the central longitudinal axis and has a first electrically conductive surface proximate the second portion of the housing, a second electrically conductive surface proximate the second portion of the housing and spaced from the first electrically conductive surface to form a discharge gap, a fuel supply to provide at least one of fuel or air/fuel mixture to the discharge gap. The system includes a controller that provides at least one electrical pulse between the first electrically conductive surface and second electrically conductive surface.

In another preferred embodiment, an ignitor comprises a housing having a first portion and a second portion, a first electrically conductive surface proximate the second portion of the housing, a second electrically conductive surface proximate the second portion of the housing and spaced from the first electrically conductive surface to form a discharge gap. The discharge gap has a discharge initiation region. A fluid passage extends between the first portion and the second portion of the housing, the fluid passage being in communication with the discharge gap. An insulator has a surface exposed to the discharge gap.

In another embodiment, an ignitor comprises a housing having a first portion and a second portion, a first electrically conductive surface proximate the second portion of the housing, the first conductive surface having a first length, a second electrically conductive surface spaced from the first electrically conductive surface to form a discharge gap. The second electrically conductive surface has a second length. The shorter of the first and second lengths defines a discharge gap length. The shortest distance between the first electrically conductive surface and the second electrically conductive surface define a discharge gap width, where a ratio of the discharge gap width to the discharge gap length being greater than about one to about three. A fluid passage extends between the first portion and the second portion. The fluid passage being in communication with the discharge gap.

In a preferred embodiment, the present invention provides an ignitor. The ignitor comprises a housing having a first portion and a second portion disposed along a central longitudinal axis. An electrode extends along the central longitudinal axis and having a first surface proximate the second portion of the housing, a second electrically conductive surface proximate the second portion of the housing and spaced from the first electrically conductive surface to form a discharge gap. A fluid passage extends between the first portion and the second portion, the fluid passage being spaced from the longitudinal axis and in communication with the discharge gap.

In another preferred embodiment, the present invention provides for a method of dissociating fuel for a combustion system. The combustion system has a combustion region, a fuel supply operatively connected to the combustion region, an ignition device having a first electrically conductive surface and a second electrically conductive surface spaced from the first electrically conductive surface to form a discharge gap. The method comprises locating the ignition device so that the discharge gap is in direct communication with the combustion region; and dissociating the at least one of fuel or air/fuel mixture by the discharge gap.

In a preferred embodiment, the present invention provides for a method of ionizing at least one of fuel or air/fuel mixture for a combustion system. The combustion system has a combustion region, a fluid supply is operatively connected to the combustion region, an ignition device having a first electrically conductive surface and a second electrically conductive surface spaced from the first electrically conductive surface to form a discharge gap. The method comprises locating the ignition device so that the discharge gap is in direct communication with the combustion region; and ionizing the fluid within the discharge gap.

In a preferred embodiment, the present invention provides for a method of igniting at least one of fuel or air/fuel mixture in a combustion region by a device having at least one central electrode disposed along a longitudinal axis, a discharge gap formed between the at least one electrode and another electrode. The discharge gap being disposed about the central electrode. The method comprises dispensing at least one of fuel or air/fuel mixture to the discharge gap; and creating at least one electrical pulse across the discharge gap so that the at least one of fuel or air/fuel mixture is combusted and projected radially outward with respect to the longitudinal axis.

In a preferred embodiment, the present invention provides for a method of igniting at least one of fuel or air/fuel mixture in a combustion system. The combustion system has a combustion region, a fuel supply operatively connected to the combustion region, an ignition device having a first electrically conductive surface and a second electrically conductive surface spaced from the first electrically conductive surface. The method comprises passing an electrical pulse of first voltage at a first current to the first electrically conductive surface and a second electrically conductive surface, the first electrically conductive surface has a first length, the second electrically conductive surface has a second length, the shorter of the first and second lengths defines a discharge gap length, the shortest distance between the first electrically conductive surface and the second electrically conductive surface define a discharge gap width, where a ratio of the discharge gap width to the discharge gap length being greater than one to three; and passing a second electrical pulse less than or equal to the first voltage at a second current greater than or equal to the first.

BRIEF DESCRIPTION OF THE DRAWINGS

The accompanying drawings, which are incorporated herein and constitute part of this specification, illustrate an embodiment of the invention, and, together with the general description given above and the detailed description given below, serve to explain the features of the invention.

DETAILED DESCRIPTION OF THE PREFERRED EMBODIMENT

Figure 1:
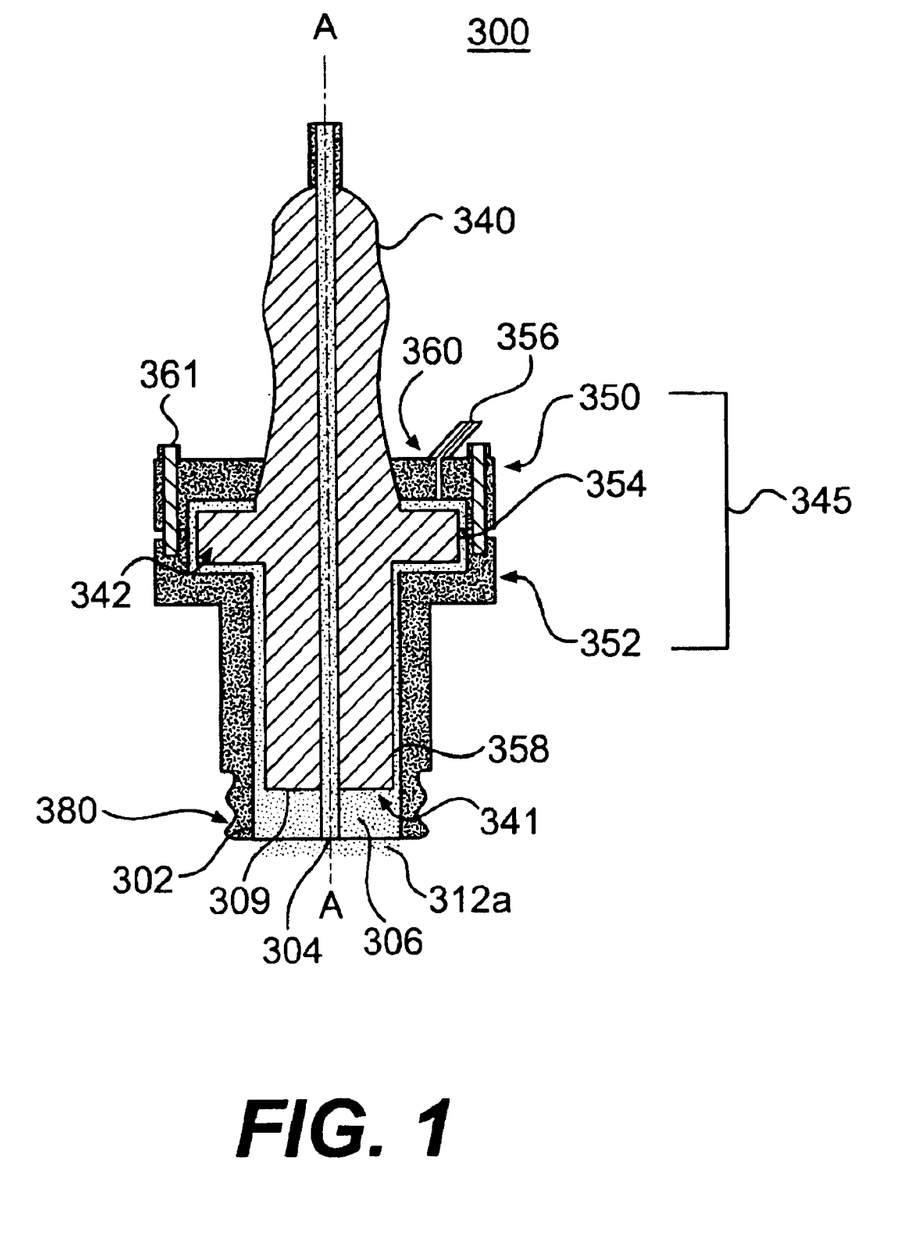
FIG. 1 illustrates a cross-sectional view of a device of a preferred embodiment of the invention that dissociates fuel and ignites a hydrogen-enhanced combustible mixture.
Figure 2:
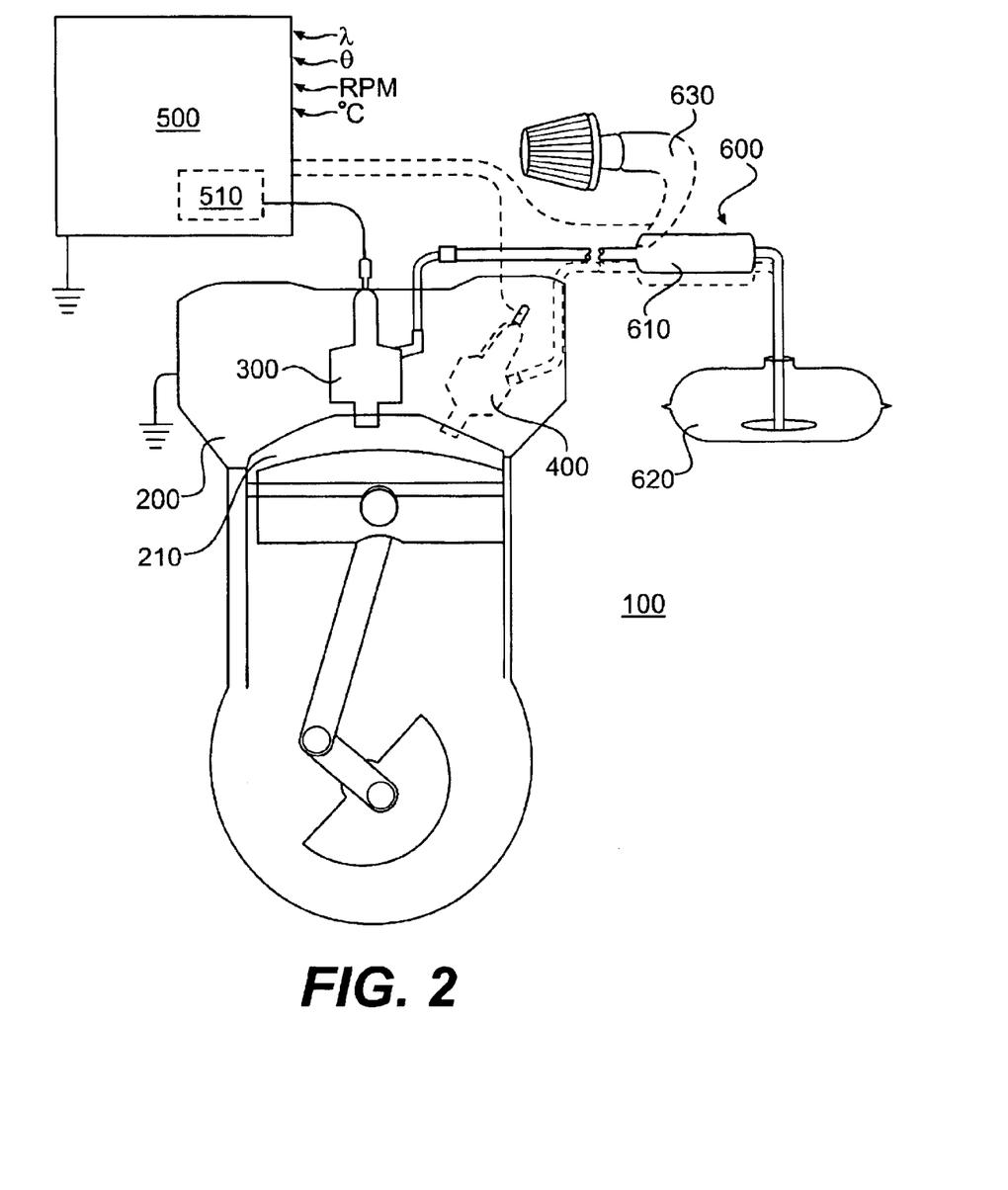
FIG. 2 illustrates a combustion enhancement system of a preferred embodiment of the invention.

FIGS. 1 and 2 illustrate a preferred embodiment of a combustion enhancement system. As shown in FIG. 2, the system comprises a fuel delivery system 100 with an engine 200, ignitors 300, 400, a control unit 500, and a fuel supply 600 that can pump either fuel or a mixture of air and fuel under pressure. The engine 200 can be either a two-stroke, four-stroke gasoline or diesel. The engine 200 can also be a direct injection gasoline or diesel engine of two or four strokes engine. In the case of a diesel application, the system provides hydrogen enrichment to enhance combustion. The system operates in conjunction with a combustion region that in this case is a combustion chamber 210 of a cylinder 220 of the engine 200. Although the combustion region is preferably located in the chamber, the combustion region can be any region where combustion is desired, such as, for example in a ram jet, waste oil incinerator, a jet engine or in any environment where combustion is desired.

The combustion region or chamber 210 has at least one ignitor 300 controlled by a controller 500. The controller 500 is preferably provided with a programmable computer that receives sensed inputs to determine at least one ignition or fuel delivery strategy for the engine 200. This strategy can include dissociating a fuel or a fuel and air (air/fuel) mixture to produce hydrogen by one ignitor and subsequently or essentially simultaneously causing an ignition of at least a portion of this mixture by another ignitor 400. Preferably, the controller 500 can control a single ignitor to dissociate fuel or air/fuel mixture delivered to the ignitor 300 into a hydrogen rich mixture which can be combined with additional air/fuel mixture to provide a combustible mixture ignited by the same ignitor 300.

The ignitor 300 can also be supplied with at least one of fuel or air and fuel (air/fuel) mixture by a fuel supply 600. The ignitor can dissociate, ignite or dissociate and ignite. Here, fuel supply 600 can include a pump 610 that draws fuel from a fuel tank 620 to supply fuel to the ignitor 300. Alternatively, fuel supply 600 can also supply compressed air or a mixture of compressed/uncompressed air and fuel to the ignitor 300 for dissociation and/or combustion of a combustible mixture. The fuel can be delivered to the combustion region either through the same ignitor 300 or by delivering the fuel from any point within the combustion region to the ignitor 300, such as, for example, spraying the fuel across the combustion region. The fuel can be hydrocarbons type fuel or other combustible materials including materials that contain an oxidizer as part of their physical structures. Preferably, the fuel is gasoline or natural gas for spark ignited engine.

The ignitor 300 is disposed proximate the combustion region. The ignitor 300 is located proximate the combustion chamber so that operation of the ignitor 300 affects the condition of fuel and air/fuel mixture entering the combustion chamber. Preferably, the ignitor 300 is disposed proximate the combustion chamber by a mechanical coupling to a cylinder head of the engine 200, for example, by an integral coupling or for example, a threaded coupling 380. In FIG. 1, the ignitor 300 includes a housing that can include a first casing 350 coupled to a second casing 352 by a mechanical coupling, such as, for example, bolt 361 with a high temperature and high pressure seal 354 disposed between the two casings. The casing can be disposed asymmetrically along an axis. Here, the axis can be along or on the longitudinal axis A—A. Preferably, the casing is symmetrically disposed about an axis that may or may not be the longitudinal axis A—A.

A portion of the second casing 352 constitutes an electrode or a first electrically conductive surface 302. The first electrically conductive surface 302 also has helical threads 380 that mate with corresponding threads formed in the cylinder head which can provide an electrical ground to be connected to the ignitor 300. Preferably, the first electrically conductive surface and the second electrically conductive surface are operatively connected to a coaxial cable to provide the electrical ground or a current return. An insulator 340, preferably an electrical insulator, is disposed in the housing with a central electrode or a second electrically conductive surface(s) 304 extending through the insulator 340. The central electrode can be disposed along a central axis A—A parallel to the central axis, or on a portion of the central axis. It should be understood that the central electrode or second electrically conductive surface(s) 304 is disposed in a coaxial arrangement with the first electrically conductive surface 302 and that more than one central electrode can also be disposed about the central axis A—A of the ignitor 300. Alternatively, one or even two or more electrodes can be disposed with different offsets relative to the central axis A—A. Additionally, each electrode can have a plurality of rods extending therefrom.

Although the insulator 340 is shown with a radial boss portion 342, the ignitor 300 can be formed without such boss portion as long as a sufficient gap remains between the insulator 340 and the housing to allow fuel to flow from the port 356 to the discharge gap 306.

Figure 3:
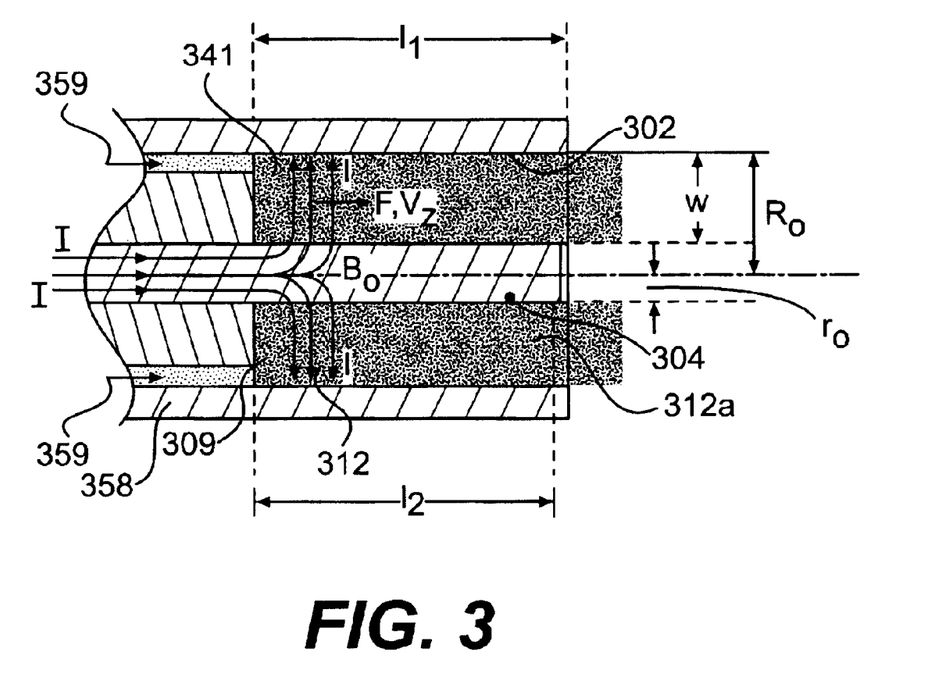
FIG. 3 is a closeup view of that provides an explanation of the fuel enrichment process illustrated in illustrated in FIG. 1.

As shown in FIGS. 1 and 3, a first electrically conductive surface 302 is spaced from a second electrically conductive surface(s) 304 to form a discharge gap 306. The discharge gap 306 is in direct communication with the combustion region. In particular, the discharge gap 306 and the combustion chamber are oriented so that any medium in the discharge gap 306 can flow to the combustion chamber through an exit of the discharge gap 306 without any positive mechanical restriction, such as, for example, a check valve. However, intermediate passages or chambers can be employed between the discharge gap 306 and the combustion chamber. The discharge gap 306 includes a discharge initiation region around the general area 309, which is a region of lowest breakdown resistance between the electrically conductive surfaces. The discharge initiation region around the general area 309 can be formed at any region between the first electrically conductive surface 302 and a surface of the insulator 341 and the second electrically conductive surface 304. In some applications, an exposed surface of the insulator 341 can constitute at least a portion of the discharge initiation region around the general area 309.

A port 356 can be coupled to either one of the first or second casing. The port 356 allows fuel from a fuel supply 600 to communicate with the discharge gap 306. The port 356 includes an entry portion 360 on the casing. The entry portion can be connected to a fuel supply 600, such as, for example, a fuel injector. Thus, the fuel supply 600 is in fluid communication with the discharge gap 306 through a fluid passage 358 to deliver fuel 359. Although the passage is shown as being generally symmetrical, the passage can be offset in relation to the central axis A—A. Moreover, the passage 358 can also be disposed on or at only a certain portion along the central axis A—A.

At least a portion of the insulator 340 can be a porous material to allow fluid communication with the discharge gap 306. The insulator 340 can include a semiconductor or a dielectric material. The insulator 340 preferably includes a polarizable ceramic, however, other materials such as molded alumina, machinable glass ceramics, stabilized zirconia, refractory cement or a magnetic type ceramic can be employed as part of or as the insulator 340. Preferably, the electrically conductive surfaces, which are surfaces of the electrodes, can be steel, clad metals, platinum-plated steel, platinum, copper, inconel, molybdenum or tungsten. Alternatively, the electrically conductive surface(s) can be high temperature permanent magnet material(s).

It has been determined that a certain relationship between the dimensional parameters of the electrically conductive surfaces and the insulator 340 is important for an efficient use of energy and for the durability of materials. These dimensional parameters are a "discharge gap length" and a "discharge gap width." Here, the "discharge gap length" is defined as the shortest length of one or more electrically conductive surface(s) that extends from the discharge initiation region around the general area 309 towards the exit of the discharge gap 306. The orientation of the discharge gap length and discharge width are defined with respect to an axis that can be parallel to or transverse to a longitudinal axis A—A of either one or both electrically conductive surfaces.

For example, in a preferred embodiment, shown here in FIG. 3, a first length $1_1$ of the first electrically conductive surface(s) 302 that extends from the discharge initiation region around the general area 309 towards the exit along an axis that is also parallel to the longitudinal axis A—A is first determined. A second length $1_2$ of the second electrically conductive surface(s) 304 that also extends from the discharge initiation region around the general area 309 towards the exit is determined. A shorter of the two lengths $1_1$ and $1_2$ defines the "discharge gap length."

The "discharge gap width", on the other hand, is the shortest distance between the first electrically conductive surface(s) 302 and the second electrically conductive surface(s) 304.

It has been determined that, in some case, a ratio of the "discharge gap width" with respect to the "discharge gap length" should be greater than about one to about three (~1:~3) with, in a preferred embodiment, a maximum value of the ratio of the discharge gap width to the discharge gap length being about three.

Figure 4:
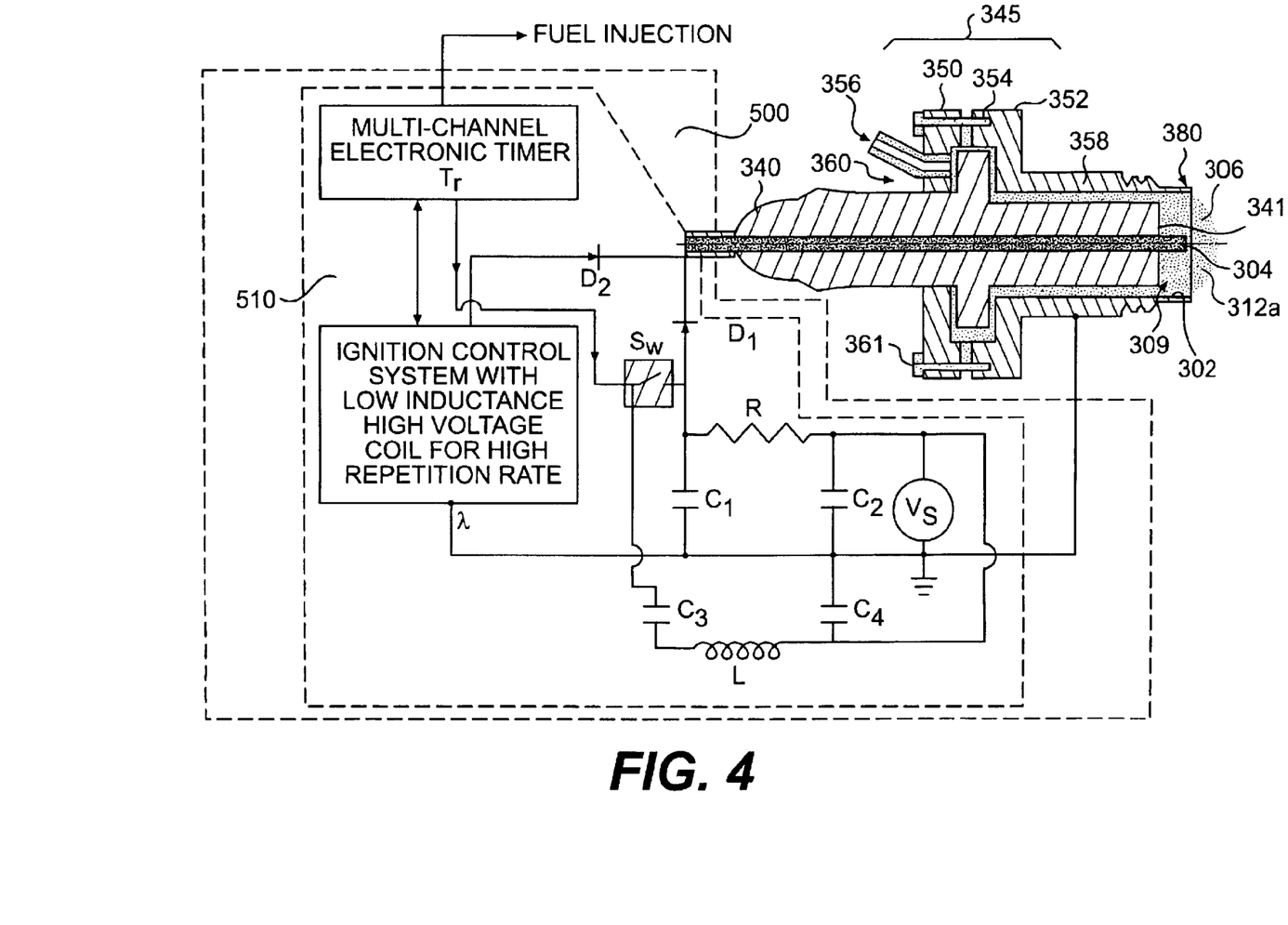
FIG. 4 is a schematic diagram of the hydrogen-enrichment/ignition device of FIG. 1 in conjunction with a controller circuit that operates the hydrogen-enrichment/ignition device.

FIG. 4 illustrates schematically a principal operation of the ignitor 300 that ignites injected fuel or fuel/air mixture provided through the plug. Fuel 349 is provided to the discharge gap 306 through a passage way 358 as described above. At least one electrical pulse of relatively low energy is delivered to one of the two electrically conducting surfaces. Preferably, the electrical pulse is a series of pulses at a high repetition rate, preferably at least one order of magnitude greater than the frequency of combustion cycle at which the engine 200 is running. A plasma is then created during the process of high voltage breakdown of the gaseous mixture within the discharge gap 306. The location of the initial gas breakdown region can be referred to as the discharge initiation region around the general area 309. In many cases, the ionized mixture or plasma is created near the surface of the insulator 341 by the application of rapid low-energy electrical pulses. Due to the current flowing in the plasma, a current flow is generated in the ignitor electrode structure. This current produces a magnetic field that generates a Lorentz force on the current flowing in the discharge. This force may be sufficient to move the plasma. Preferably, the plasma 312 is moved from the discharge initiation region around the general area 309 towards the exit of the discharge gap 306 by the action of Lorentz force As the plasma 312 is moved toward the end of the electrodes, (i.e. towards the combustion region, it dissociates the gaseous mixture producing molecules of hydrogen ($H_2$) and carbon monoxide (CO) molecules, both of which are generated in the plasma 312 from fuel molecules according to Equation (1). In order for this hydrogen enrichment process to be efficient, the current pulse though the plasma 312 should be sufficiently short and of many repetitions to keep the plasma 312 away from the exit end of the discharge gap 306 of the first and second electrically conductive surface(s) 304 and 302.

In FIG. 1, a high-pressure fuel injector (not shown) is coupled to a fuel injection line in the ignitor 300. The insulator 340 is configured to allow a sufficient gap between insulator 340 and external electrode for a flow of the fuel 359. The second casing 352 that forms a part of the first electrically conductive surface 302 is hermetically sealed to the insulator 340. The second casing 352 is attached to the first casing and sealed with at least one high-temperature, high-pressure seal. Fuel 359 can travel between the first electrically conductive surface 302 and insulator 340 into the free space between the central and outer electrodes at the end of the insulator 340.

Returning to FIG. 3, when fuel 359 reaches the free space 309 between the electrodes (at the end of the insulator), a high voltage pulse from a pulse generator 510 (FIG. 2) of the controller to the central electrode will initiate a discharge between electrodes. Under certain conditions, this discharge will be initially along the surface of the insulator 340. Lorentz and thermal forces will then propagate the plasma 312 (i.e. ionized fuel or air/fuel mixture) away from the discharge initiation region around the general area 309. During discharge propagation between the electrodes, the electrical current flowing in the discharge initiation region around the general area 309 will further ionize fuels or fuel/air mixture, creating a large volume plasma 312a. It is believed that in order to enhance the production of hydrogen in the discharge gap 306, the energy delivered to the plasma 312 should be controlled so as to favor dissociation as opposed to producing a high degree of ionization that is believed to be typical of an ignitor 300 employed to produce combustion.

This can be achieved by decreasing the energy of the electrical pulse. Plasma parameters such as temperature, volume, and velocity can be controlled by modifying at least one of the voltage, current, and frequency of at least one electrical pulse. This allows considerable freedom in optimizing the system as a function of the volume of fuel injected and the amount of hydrogen generated when the system operates as a hydrogen generator. An additional parameter in the system optimization is the relationship of the discharge gap width "w" between the electrodes and the discharge gap length of the electrodes "l" (where "l" is the shortest of the lengths "$l_1$," and "$l_2$"). The parameters described allow a control of the plasma velocity by controlling at least one of the energy current and duration of the electrical pulse.

The ignitor 300 as described above can be operated in two separate modes as part of a fuel delivery system.

MODE I

In MODE I, the ignitor 300 functions only as a fuel injection and hydrogen-generating device. To provide for combustion of the fuel or air/fuel mixture, the system requires a second ignitor, such as ignitor 400 (FIG. 2) to provide for the ignition function.

MODE II

In MODE II, this system functions as both a hydrogen generating and ignitor of the fuel or air/fuel mixture in the combustion chamber. When operating as a hydrogen-generating device, the system operates at low energy, high repetition rate electrical pulses. The number of these pulses depends on the volume of the injected fuel required and the duration of time $t_f$ of the pulses firing before igniting the electrical pulse at $t_i$. At ignition time $t_p$ where $t_i > t_p$ the high-energy electrical pulse is provided by an additional pulse generator. The system can be optimized for the number of low energy high frequency electrical pulses, electrical energy delivered per pulse and the volume of fuel delivered by the fuel injector (not shown).

In one case, the ignitor 300 operating in MODE II can operate with a single pulse when a sufficiently large amount of fuel or fuel/air mixture is flowing through the spark plug with a large (~300 mJ) amount of electrical energy delivered to the ignitor 300. Such large electrical pulses are required in order to form the plasma 312 that ignites the combustible mixture. The dissociation described here, preferably, forms the basis of hydrogen-enrichment, which generates hydrogen-rich fuel and air and fuel mixture for combustion. The plasma 312, being enriched by hydrogen is combusted and accelerated towards the combustion chamber. This condition of the plasma 312 determines the limit of the ratio of electrical pulse energy to the length of the discharge gap 306 between the electrodes. A good indicator of such condition can be where the discharge current that should not extend beyond ⅓ of the length of the electrode from the discharge initiation region around the general area 309 of the discharge gap 306. For example, for a length of an electrode of about 3 mm, gap width of 1.2 mm, with an average velocity of the plasma 312 travelling through the discharge gap 306 at $3 \times 10^4$ cm per second, the pulse should not exceed 3 microsecond.

FIG. 4 represents a simplified schematic representation of a controller 500 having dual-energy device that allows the ignitor 300 to operate in either MODE I or MODE II. The dual-energy device, shown here in a simplified schematic format is to believed, preferably, to require an ignition controller, a multi-channel timer $Tr_1$, an extremely fast switch SW, two diodes, four capacitors, one resistor and one inductor. These components can also be integrated into a single component, divided into separate subcomponents, or by circuits that achieve the functions described for the system. In MODE I, capacitors $C_3$ and $C_4$ and inductor L are part of separate ignition system for a second ignitor 400 (FIG. 2), which can also be a travelling-spark-ignitor (TSI) as described in U.S. Pat. Nos. 5,704,321 and 6,131,542, which are incorporated by reference in their entirety.

In MODE II, electronic Timer $Tr_1$ provides signal at an adjustable delay time after stop signal, to close Electronic Switch ($S_w$), which connects capacitors $C_3$ and $C_4$, charged to voltage $V_s$, to central electrodes through diode $D_1$. These capacitors provide low voltage and high current electrical pulse of at least 10–20 times higher energy than the energy provided by capacitors $C_1$ and $C_2$ in order to ignite combustion mixture in combustion chamber. By using this circuit, a low energy high repetition rate electrical pulse is provided to the ignitor. This low energy high repetition pulse, preferably, is a first current and a second current, the voltage related to the first current is greater than the voltage related to the second current, and the first current is less than the second current. Here, the first current and the second current are adjustable so that one of the fuel or air/fuel mixture is dissociated without combustion.

The role of capacitors $C_1$ and $C_2$ is to enhance energy provided by the ignition coil. Resistor R is used to match a time constant of discharging capacitors $C_1$ and $C_2$ to a duration of the movement of the plasma 312 in the discharge gap 306 when a distance covered by the plasma 312 is approximately equal ⅓ of the length of electrodes. Inductor L can be used to provide a match of a discharge time constant of capacitors $C_3$ and $C_4$ to a duration of the movement of the plasma 312 in the ignitor 300 over a distance equal to the length of electrodes (from surface of insulator 340 to the end of electrodes).

Electronic Timer $Tr_1$, initiates an engine controller (not shown) which injects fuel or fuel/air mixture from a fuel injector at or before a time of low energy discharges in order to provide time for fuel or fuel/air mixture to reach the surface 341 of the insulator 340 or the discharge initiation region generally shown at 309 where electrical breakdown can occur. The duration of fuel injection is also controlled by timer $Tr_1$ and is equal or less than about the total time duration of all low energy pulses before the electrical pulses for ignition are delivered.

A schematic of an electrical circuit that, preferably, can be utilized in this system is shown in FIG. 4. A low inductance, high capacitive discharge ignition device, which is part of the controller 500, is connected to central electrode 304 of ignitor through diode $D_2$. The outside electrode is grounded. Power supply, which typically provides a voltage of about 500 V, charges larger capacitor $C_4$ (preferably $C \approx 2-3$ $\mu$F) and smaller capacitor $C_3$ (preferably $C \approx 0.2-0.3$ $\mu$F). Both capacitors can be connected to central electrode via the electronic switch and diode $D_1$. Diode $D_2$ prevents current of power supply from reaching the ignition device, and diode $D_1$ prevents high voltage from the ignition coil of ignition controller from all capacitors $C_1$, $C_2$, $C_3$, $C_4$ and the power supply.

Alternatively, diode $D_1$ can be replaced by an inductor, and the high voltage diode $D_2$ can be replaced by air-gap with a peaking capacitor (not shown). The air gap can be adjusted in such a way as to allow peaking capacitor to be charged to sufficiently high voltage to breakdown between electrodes of spark plug along the surface of insulator 340 (e.g. ceramic).

The circuit 510 of the controller can provide low energy pulses at much higher repetition rate than conventional ignition circuit. Preferably, the circuit 510 should provide at least 10 times higher repetition rate than the ignition circuit of the TSI (as described in U.S. Pat. Nos. 5,704,321 and 6,131,542, and in International Application PCT/US00/16747, titled "IGNITION SYSTEM FOR STRATIFIED FUEL MIXTURES", filed Jun. 16 2000; all of which are incorporated by reference in their entirety).

Returning to FIG. 4, an electronic switch ($S_w$) allows capacitors $C_3$ and $C_4$ to disconnect from electrical line leading to central electrode and only at certain time $t_i$ will connect capacitors $C_3$ and $C_4$ to this line in order to generate a more powerful discharge in the ignitor 300 and ignite combustion mixture (i.e., mode II of operation). In MODE I operation, the switch is normally open. The switch, preferably, should be capable of sustaining electrical current up to 500–1000 A and, preferably, a life cycle of about $10^9$ without any significant deterioration, such as, for example, a plasma switch or a krytron switch.

Electrical pulses are required to initiate the flow from the fuel supply 600 to the fuel injector and to open the valve of the fuel injector (not shown), which is attached to the ignitor 300 as is shown schematically in FIG. 4. These electrical pulses are synchronized with triggering pulses of the controller 500, which initiates firing of the ignitor 300. The synchronization is provided in such a way that the electrical pulse, which triggers the controller 500, can also trigger the electrical pulse for the fuel injector. The controller triggering pulse is delayed by $\tau$ in relation to fuel injector triggering pulse in order for fuel or fuel/air mixture from the fuel injector to reach the area near insulator surface of the ignitor 300 before breakdown of high voltage pulse arrives from a high-voltage coil of the controller. The delay time $\tau$ is set for each particular fuel injector and ignition system for the best performance of the system. This set point can be established by monitoring engine performance through a dynamometer mapping or other testing while measuring operating conditions of the particular engine or vehicle.

While the present invention has been disclosed with reference to certain embodiments, numerous modifications, alterations and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

What is claimed is:

1. A system, comprising:
   an ignitor proximate a combustion region, the ignitor including a first electrically conductive surface disposed at a first location spaced from a second electrically conductive surface disposed at a second location fixed thereto with respect to the first location to form a discharge gap in direct communication with the combustion region;
   a fuel supply that provides at least one of fuel or air/fuel mixture to the gap; and
   a controller that provides at least one electrical pulse between the first conductive surface and second conductive surface that dissociates at least a portion of at least one of fuel or air /fuel mixture passing through the discharge gap.

2. The system of claim 1, wherein the combustion region comprises a region within an internal combustion engine.

3. The system of claim 1, wherein the at least one electrical pulse comprises at least one first electrical pulse that dissociates the at least one of fuel or air/fuel mixture and at least one second electrical pulse that ignites combustible mixture.

4. The system of claim 3, wherein the at least one second electrical pulse comprise a higher energy value than any one of the at least one electrical pulse.

5. The system of claim 3, wherein the at least one electrical pulse comprises at least one first electrical pulse at a first frequency, and at least one second electrical pulse at second frequency lower than the first frequency.

6. The system of claim 5, wherein the at least one second electrical pulse is provided by an electronic switch.

7. The system of claim 6, wherein the at least one second electrical pulse is provided after the adjustable time interval to another ignitor located in the combustion region.

8. The system of claim 1, wherein the ignitor further comprises a casing having a surface disposed along a longitudinal axis, an entry portion and an exit portion being offset along the longitudinal axis;
   a port disposed in the casing, the port being in communication with the discharge gap;
   an insulator at least partially disposed in the casing, the insulator having at least one surface exposed to the surface of the casing to define a communication passage between the port and the exit portion of the casing.

9. The system of claim 8, wherein the system further comprises a fuel injector coupled to the port.

10. The system of claim 1, wherein the first electrically conductive surface comprises at least a portion of a first rod and the second electrically conductive surface comprises at least a portion of a second rod.

11. The system of claim 10, which the first electrically conductive surface comprises a portion of a surface of a first cylinder and the second electrically conductive surface comprises a portion of a surface of a second cylinder, a diameter of the second cylinder being greater than the diameter of the first cylinder.

12. The system of claim 11, wherein the first electrode and the second electrode are coaxial.

13. The system of claim 10, wherein at least one of the first rod and second rod comprises a plurality of rods.

14. The system of claim 1, wherein the ignitor further comprises a casing having an insulator at least partially disposed in the discharge gap, at least a portion of the insulator comprises a porous material to allow fluid communication with the discharge gap.

15. The system of claim 1, wherein the at least one electrical pulse ignites the at least one of fuel or air/fuel mixture.

16. The system of claim 1, wherein the fuel supply further comprises a fuel supply connected to the ignitor so that the at least one of fuel or air/fuel mixture flows through the ignitor to the discharge gap.

17. The system of claim 1, wherein the controller provides at least one electrical pulse of about 300 milliJoules per pulse.

18. A system comprising:
an ignitor proximate a combustion region, the ignitor including a first electrically conductive surface spaced from a second electrically conductive surface to form a discharge gap in direct communication with the combustion region;
a fuel supply that provides at least one of fuel or air/fuel mixture to the gap; and
a controller that provides at least one electrical pulse between the first conductive surface and second conductive surface that dissociates at least a portion of at least one of fuel or air /fuel mixture passing through the discharge gap, wherein the at least one electrical pulse that dissociates at least one of fuel or air/fuel mixture passing through the discharge gap results in the production of hydrogen.

19. The system of claim 18, wherein the at least one first electrical pulse comprises a series of electrical pulses at a first frequency that dissociates the at least one of fuel or air/fuel mixture.

20. A system comprising:
an ignitor proximate a combustion region, the ignitor including a first electrically conductive surface spaced from a second electrically conductive surface to form a discharge gap in direct communication with the combustion region;
a fuel supply that provides at least one of fuel or air/fuel mixture to the gap; and
a controller that provides at least one electrical pulse between the first conductive surface and second conductive surface that dissociates at least a portion of at least one of fuel or air /fuel mixture passing through the discharge gap, wherein the at least one electrical pulse comprises at least one first electrical pulse that dissociates the at least one of fuel or air/fuel mixture and at least one second electrical pulse that ignites combustible mixture, and the at least one second electrical pulse is provided by another ignitor.

21. A system comprising:
an ignitor proximate a combustion region, the ignitor including a first electrically conductive surface spaced from a second electrically conductive surface to form a discharge gap in direct communication with the combustion region, the ignitor further comprises a casing having a surface disposed along a longitudinal axis, an entry portion and an exit portion being offset along the longitudinal axis;
a port disposed in the casing, the port being in communication with the discharge gap;
an insulator at least partially disposed in the casing, the insulator having at least one surface exposed to the surface of the casing to define a communication passage between the port and the exit portion of the casing;
a fuel supply that provides at least one of fuel or air/fuel mixture to the gap; and
a controller that provides at least one electrical pulse between the first conductive surface and second conductive surface that dissociates at least a portion of at least one of fuel or air /fuel mixture passing through the discharge gap, wherein the casing further comprises a first part secured to a second part by at least one high temperature and high pressure seal.

22. A system comprising:
an ignitor proximate a combustion region, the ignitor including a first electrically conductive surface spaced from a second electrically conductive surface to form a discharge gap in direct communication with the combustion region;
a fuel supply that provides at least one of fuel or air/fuel mixture to the gap; and
a controller that provides at least one electrical pulse between the first conductive surface and second conductive surface that dissociates at least a portion of at least one of fuel or air /fuel mixture passing through the discharge gap, wherein the at least one electrical pulse that dissociates at least one of fuel or air/fuel mixture passing through the discharge gap results in the production of hydrogen, and the at least one electrical pulse comprise a first current and a second current, the voltage of the first current being greater than the second current, and the first current being less than the second current.

23. The system of claim 22, wherein the first current and the second current are adjustable so that a fuel or air/fuel mixture of the at least one of fuel or air/fuel mixture is dissociated without combustion.

24. The system of claim 22, wherein the at least one electrical pulse is provided at a first time interval and the at least one second electrical pulse is provided at a second time interval, the first time interval and the second time interval being offset by an adjustable time interval.

25. The system of claim 24, wherein the adjustable time interval is provided by a timer.

26. A system comprising:
an ignitor proximate a combustion region, the ignitor including a first electrically conductive surface spaced from a second electrically conductive surface to form a discharge gap in direct communication with the combustion region;
a fuel supply that provides at least one of fuel or air/fuel mixture to the gap; and
a controller that provides at least one electrical pulse between the first conductive surface and second conductive surface that dissociates at least a portion of at least one of fuel or air /fuel mixture Passing through the discharge gap, wherein the at least one electrical pulse of the controller further comprises:
an electrical pulse to initiate flow of fuel or air/fuel mixture from the fuel supply to the ignitor; and
electrical pulse to initiate injection of fuel into the combustion region; and
an electrical pulse to initiate firing of the ignitor to ignite a combustible mixture in the combustion region.

27. A system, comprising:
an ignitor proximate a combustion region, the ignitor including:
a first electrically conductive surface spaced from a second electrically conductive surface to form a discharge gap in direct communication with the combustion region; and an insulator having a surface, at least a portion of the surface exposed to the discharge gap between the first and second electrically conductive surfaces;

a fuel supply to provide at least one of fuel or air/fuel mixture to the discharge gap; and a controller that provides at least one electrical pulse between the first electrically conductive surface and the second electrically conductive surface.

28. The system of claim 27, wherein the discharge gap comprises a discharge initiation region, and the at least a portion of the surface providing a portion of the discharge initiation region.

29. The system of claim 27, wherein the at least one electrical pulse comprises at least one first electrical pulse that dissociates the at least one of fuel or air/fuel mixture in proximity to the discharge gap.

30. The system of claim 29, wherein the at least one electrical pulse comprises at least one second electrical pulse that ignites a combustible mixture.

31. The system of claim 27, wherein the at least one electrical pulse ignites the at least one of fuel or air/fuel mixture.

32. The system of claim 27, wherein the ignitor further comprises a casing having a surface disposed along a longitudinal axis, an entry portion and an exit portion being offset along the longitudinal axis;

a port disposed in the casing, the port being in communication with the discharge gap;

the insulator having at least one surface exposed to the surface of the casing to define a communication passage between the port and the exit portion of the casing.

33. The system of claim 32, wherein the at least one electrical pulse comprises at least one first electrical pulse that dissociates the at least one of fuel or air/fuel mixture and at least one second electrical pulse that ignites a combustible mixture.

34. The system of claim 32, wherein the entry port comprises a port in fluid communication with the fuel supply so that the at least one of fuel or air/fuel mixture flows through the ignitor to the discharge gap.

35. The system of claim 27, wherein the insulator comprises a porous material.

36. The system of claim 27, wherein the combustion region comprises a cylinder of an internal combustion engine.

37. A system comprising:

an ignitor proximate a combustion region, the ignitor including:
  a first electrically conductive surface spaced from a second electrically conductive surface to form a discharge gap in direct communication with the combustion region; and
  an insulator having a surface exposed to the discharge gap, at least a portion of the surface exposed to the discharge gap;

a fuel supply to provide at least one of fuel or air/fuel mixture to the discharge gap; and a controller that provides at least one electrical pulse between the first electrically conductive surface and the second electrically conductive surface, wherein the first conductive surface has a first length;

a second electrically conductive surface has a second length, the shorter of the first and second lengths defining a discharge gap length, the shortest distance between the first electrically conductive surface and the second electrically conductive surface defining a discharge gap width, a ratio of the discharge gap width to the discharge gap length being greater than one to three.

38. The system of claim 37, wherein the at least one electrical pulse comprises at least one first electrical pulse that dissociates the at least one of fuel or air/fuel mixture and at least one second electrical pulse that ignites a combustible mixture.

39. A system comprising:

an ignitor proximate a combustion region, the ignitor including:
  a first electrically conductive surface spaced from a second electrically conductive surface to form a discharge gap in direct communication with the combustion region; and
  an insulator having a surface exposed to the discharge gap, at least a portion of the surface exposed to the discharge gap;

a fuel supply to provide at least one of fuel or air/fuel mixture to the discharge gap; and a controller that provides at least one electrical pulse between the first electrically conductive surface and the second electrically conductive surface, wherein the controller further provides:
  an electrical pulse to initiate flow of fuel or air/fuel mixture from the fuel supply to the ignitor;
  an electrical pulse that dissociates at least a portion of at least one of fuel or air /fuel mixture passing through the discharge gap;
  an electrical pulse to initiate injection of fuel into the combustion region; and
  an electrical pulse to initiate firing of the ignitor to ignite a combustion mixture in the combustion region.

40. A system, comprising:

an ignitor proximate a combustion region , the ignitor including:
  a housing;
  a first electrically conductive surface having a first length;
  a second electrically conductive surface spaced from the first electrically conductive surface to form a discharge gap, the second electrically conductive surface has a second length, the shorter of the first and second lengths defining a discharge gap length, the shortest distance between the first electrically conductive surface and the second electrically conductive surface defining a discharge gap width, a ratio of the discharge gap width to the discharge gap length being greater than one to three;

a fuel supply operatively connected to ignitor to provide at least one of fuel or air/fuel mixture to the discharge gap; and a controller that provides at least one electrical pulse between the first electrically conductive surface and second electrically conductive surface.

41. The system of claim 40, wherein the ratio of the discharge gap width to discharge gap length being greater than one to two.

42. The system of claim 41, wherein the ratio of the discharge gap width to discharge gap length being greater than one to one-and-one-half.

43. The system of claim 42, wherein the at least one electrical pulse comprises at least one first electrical pulse that dissociates the at least one of fuel or air/fuel mixture and at least one second electrical pulse that ignites a combustion mixture.

44. The system of claim 43, wherein the at least one electrical pulse comprises at least one electrical pulse that enriches the at least one of fuel or air/fuel mixture with hydrogen.

45. The system of claim 41, further comprising an insulator, the insulator being a porous material.

46. The system of claim 40, wherein the at least one electrical pulse comprises at least one first electrical pulse that dissociates the at least one of fuel or air/fuel mixture and at least one second electrical pulse that ignites a combustion mixture.

47. The system claim 46, wherein the at least one electrical pulse that dissociates comprises at least one electrical pulse that enriched the at least one of fuel or air/fuel mixture with hydrogen.

48. The system of claim 40, the ignitor further comprises a casing having a surface, an entry portion and an exit portion being offset along an axis;
a port disposed in the casing, the port being in communication with the discharge gap;
an insulator having at least one surface exposed to the surface of the casing to define a communication passage between the port and the exit portion of the casing.

49. The system of claim 43, wherein the at least one electrical pulse comprises at least one first electrical pulse that dissociates the at least one of fuel or air/fuel mixture and at least one second electrical pulse that ignites a combustion mixture.

50. The system of claim 48, wherein the entry port comprises a port in fluid communication with the fuel supply so that the at least one of fuel or air/fuel mixture flows through the ignitor to the discharge gap.

51. A system, comprising:
an ignitor coupled to the combustion region, the ignitor including:
a housing having first portion and a second portion disposed along a central longitudinal axis;
an electrode extending along the central longitudinal axis and having a first electrically conductive surface proximate the second portion of the housing; and
a second electrically conductive surface proximate the second portion of the housing and spaced from the first electrically conductive surface to form a discharge gap; and
an insulator having a surface, at least a portion of the surface exposed to the discharge gap between the first and second electrically conductive surfaces;
a fuel supply to provide at least one of fuel or air/fuel mixture to the discharge gap; and
a controller that provides at least one electrical pulse between the first electrically conductive surface and second electrically conductive surface.

52. The system of claim 51, wherein the at least one electrical pulse ignites the at least one of air or air/fuel mixture.

53. The system of claim 52, wherein the at least one electrical pulse comprises at least one first electrical pulse that dissociates the at least one of fuel or air/fuel mixture and at least one second electrical pulse that ignites a combustion mixture.

54. The system of claim 51, wherein the first electrically conductive surface is coaxial with the second electrically conductive surface.

55. The system of claim 51, wherein the housing comprises an entry port in fluid communication with the fuel supply so that the at least one of fuel or air/fuel mixture flows through the ignitor to the discharge gap.

56. A system comprising:
an ignitor coupled to the combustion region, the ignitor including:
a housing having first portion and a second portion disposed along a central longitudinal axis;
an electrode extending along the central longitudinal axis and having a first electrically conductive surface proximate the second portion of the housing; and
a second electrically conductive surface proximate the second portion of the housing and spaced from the first electrically conductive surface to form a discharge gap;
a fuel supply to provide at least one of fuel or air/fuel mixture to the discharge gap; and
a controller that provides at least one electrical pulse between the first electrically conductive surface and second electrically conductive surface, wherein the controller further provides:
an electrical pulse to initiate flow of fuel or air/fuel mixture from the fuel supply to the ignitor;
an electrical pulse to initiate injection of fuel into the combustion region; and
an electrical pulse to initiate firing of the ignitor to ignite a combustion mixture in the combustion region.

57. An ignitor comprising:
a housing having a first portion and a second portion;
a first electrically conductive surface proximate the second portion of the housing;
a second electrically conductive surface proximate the second portion of the housing and spaced from the first electrically conductive surface to form a discharge gap, the discharge gap having a discharge initiation region;
a fluid passage extending between the first portion and the second portion, the fluid passage being in communication with the discharge gap; and
an insulator having a surface exposed to the discharge gap.

58. The ignitor of claim 57, wherein the surface comprises at least a portion of the surface provides at least a portion of the discharge initiation region.

59. The ignitor of claim 57, wherein the housing further comprises a casing having a surface, the casing having an entry portion and an exit portion, the entry and exit portions being offset along an axis;
a port disposed in the casing, the port being in communication with the discharge gap;
the insulator having a surface exposed to the surface of the casing to define a communication passage between the port and the exit portion of the casing.

60. The ignitor of claim 59, wherein the insulator comprises a porous material.

61. The ignitor of claim 59, wherein the insulator comprises a porous material that permits at least one of fuel or air/fuel mixture to flow towards the discharge gap.

62. The ignitor of claim 57, wherein the first electrically conductive surface comprises at least a portion of a first rod and the second electrically conductive surface comprises at least a portion of a second rod.

63. The ignitor of claim 62, wherein at least one of the first rod and the second rod further comprises a plurality of rods.

64. The ignitor of claim 57, wherein the fluid passage comprises a fluid passage in fluid communication with a fuel supply that provides at least one of fuel or air/fuel mixture to the fluid passage.

65. An ignitor comprising:
a housing having a first portion and a second portion;
a first electrically conductive surface proximate the second portion of the housing;
a second electrically conductive surface proximate the second portion of the housing and spaced from the first electrically conductive surface to form a discharge gap, the discharge gap having a discharge initiation region;
a fluid passage extending between the first portion and the second portion, the fluid passage being in communication with the discharge gap; and
an insulator having a surface exposed to the discharge gap, wherein the first electrically conductive surface has a first length a second electrically conductive surface has a second length, the shorter of the first and a second length defining a discharge gap length, the shortest distance between the first electrically conductive surface and the second electrically conductive surface defining a discharge gap width, a ratio of the discharge gap width to the discharge gap length being greater than about one to about three.

66. An ignitor comprising:
a housing having a first portion and a second portion, the housing including a casing having a surface, the casing having an entry portion and an exit portion, the entry and exit portions being offset along an axis;
a port disposed in the casing, the port being in communication with the discharge gap;
the insulator having a surface exposed to the surface of the casing to define a communication passage between the port and the exit portion of the casing;
a first electrically conductive surface proximate the second portion of the housing;
a second electrically conductive surface proximate the second portion of the housing and spaced from the first electrically conductive surface to form a discharge gap, the discharge gap having a discharge initiation region;
a fluid passage extending between the first portion and the second portion, the fluid passage being in communication with the discharge gap; and
an insulator having a surface exposed to the discharge gap, wherein the casing further comprises a first part secured to a second part by at least one high temperature and high pressure seal.

67. An ignitor comprising:
a housing having a first portion and a second portion;
a first electrically conductive surface proximate the second portion of the housing, the first conductive surface having a first length;
a second electrically conductive surface spaced from the first electrically conductive surface to form a discharge gap, the second electrically conductive surface has a second length, the shorter of the first and second lengths defining a discharge gap length, the shortest distance between the first electrically conductive surface and the second electrically conductive surface defining a discharge gap width, a ratio of the discharge gap width to the discharge gap length being greater than about one to about three; and
a fluid passage extending between the first portion and the second portion, the fluid passage being in communication with the discharge gap.

68. The ignitor of claim 67, wherein the ratio of the discharge gap width to the discharge gap length is greater than one to two.

69. The ignitor of claim 67, wherein the ratio of the discharge gap width to the discharge gap length is greater than one to one-and-one-half.

70. The ignitor of claim 67, wherein the discharge gap has an discharge initiation region, and further comprising an insulator disposed proximate the discharge gap, the insulator having a surface exposed to the discharge gap and provides at least a portion of the discharge initiation region.

71. The ignitor of claim 70, wherein the insulator further comprises a porous material.

72. The ignitor of claim 67, wherein a maximum value of the ratio of the discharge gap width to the discharge gap length is about three.

73. The ignitor of claim 67, wherein the housing further comprises a casing having a surface, the casing having an entry portion and an exit portion being offset along an axis;
a port disposed in the casing, the port being in communication with the discharge gap; and
an insulator at least partially disposed in the discharge gap, the insulator having at least a surface exposed to the surface of the casing to define a communication passage between the port and the exit portion of the casing.

74. An ignitor comprising:
a housing having a first portion and a second portion disposed along a central longitudinal axis;
an electrode extending along the central longitudinal axis and having a first surface proximate the second portion of the housing;
a second electrically conductive surface proximate the second portion of the housing and spaced from the first electrically conductive surface to form a discharge gap;
an insulator having a surface exposed to the discharge gap between the first and second electrically conductive surfaces; and
a fluid passage extending between the first portion and the second portion, the fluid passage being spaced from the longitudinal axis and in communication with the discharge gap.

75. The ignitor of claim 74, wherein the ignitor further comprises an insulator disposed proximate the discharge gap, the discharge gap having an discharge initiation region, and at least a portion of the surface of the insulator constituting at least a portion of the discharge initiation region.

76. The ignitor of claim 74, wherein the fluid passage comprises a fluid passage in fluid communication with a fuel supply that provides at least one of fuel or air/fuel mixture to the fluid passage.

77. An ignitor comprising:
a housing having a first portion and a second portion disposed along a central longitudinal axis;
an electrode extending along the central longitudinal axis and having a first surface proximate the second portion of the housing;
a second electrically conductive surface proximate the second portion of the housing and spaced from the first electrically conductive surface to form a discharge gap; and
a fluid passage extending between the first portion and the second portion, the fluid passage being spaced from the longitudinal axis and in communication with the discharge gap, wherein the first conductive surface has a first length;
a second electrically conductive surface has a second length, the shorter of the first and second lengths defining a discharge gap length, the shortest distance between the first electrically conductive surface and the second electrically conductive surface defining a discharge gap width, a ratio of the discharge gap width to the discharge gap length being greater than about one to about three.

78. The ignitor of claim 77, wherein the ratio of the discharge gap width to the discharge gap length being greater than one to two.

79. The ignitor of claim 77, wherein the ratio of the discharge gap width to the discharge gap length being greater than one to one-and-one-half.

80. A method of dissociating fuel for a combustion system, the combustion system having a combustion region, a fuel supply operatively connected to the combustion region, the method comprising:
   providing an ignition device having a first electrically conductive surface disposed at a first location and a second electrically conductive surface disposed at a second location fixed with respect to the first location so that a discharge gap is formed therebetween;
   locating the ignition device so that the discharge gap is in direct communication with the combustion region; and
   dissociating the at least one of fuel or air/fuel mixture by the discharge gap.

81. The method of claim 80, wherein the dissociating comprises dissociating the at least one of fuel or air/fuel mixture within the discharge gap.

82. The method of claim 80, wherein the dissociating further comprises providing a series of electrical pulses at a first frequency that dissociates the fuel.

83. The method of claim 80, wherein the dissociating comprises flowing at least one of fuel or air/fuel mixture from a fuel supply through a housing of the ignition device.

84. A method of dissociating fuel for a combustion system, the combustion system having a combustion region, a fuel supply operatively connected to the combustion region, an ignition device having a first electrically conductive surface and a second electrically conductive surface spaced from the first electrically conductive surface to form a discharge gap, the method comprising:
   locating the ignition device so that the discharge gap is in direct communication with the combustion region; and
   dissociating the at least one of fuel or air/fuel mixture by the discharge gap, wherein the dissociating comprises hydrogenating the at least one of fuel or air/fuel mixture.

85. A method of dissociating fuel for a combustion system, the combustion system having a combustion region, a fuel supply operatively connected to the combustion region, an ignition device having a first electrically conductive surface and a second electrically conductive surface spaced from the first electrically conductive surface to form a discharge gap, the method comprising:
   locating the ignition device so that the discharge gap is in direct communication with the combustion region; and
   dissociating the at least one of fuel or air/fuel mixture by the discharge gap, further comprising:
      initiating a flow of fuel from the fuel supply to the ignition device with at least one electrical pulse;
      injecting at least one of fuel or air/fuel mixture into the combustion region; and
      firing the ignition device to ignite the at least one of fuel or air/fuel mixture.

86. A method of igniting a combustible mixture in a combustion system, the combustion system having a combustion region, a fuel supply operatively connected to the combustion region, an ignition device having a first electrically conductive surface and a second electrically conductive surface spaced from the first electrically conductive surface, the method comprising:
   passing an electrical pulse of first voltage at a first current between the first electrically conductive surface and a second electrically conductive surface, the first electrically conductive surface having a first length, the second electrically conductive surface has a second length, the shorter of the first and second lengths defining a discharge gap length, the shortest distance between the first electrically conductive surface and the second electrically conductive surface defining a discharge gap width, a ratio of the discharge gap width to the discharge gap length being greater than one to three; and
   passing a second electrical pulse less than or equal to the first voltage at a second current greater than or equal to the first between the discharge gap.

87. The method of claim 86, wherein the passing of the first voltage at a first current comprises flowing at least one of fuel or air/fuel mixture from a fuel supply through a housing of the ignition device.

\* \* \* \* \*